United States Patent [19]
Ito

[11] Patent Number: 5,610,767
[45] Date of Patent: *Mar. 11, 1997

[54] ZOOM LENS SYSTEM WITH SMALL NUMBERS OF LENSES AND WIDE VIEWING ANGLE

[75] Inventor: Takayuki Ito, Tokyo, Japan

[73] Assignee: Asahi Kogaku Kogyo Kabushiki Kaisha, Tokyo, Japan

[ * ] Notice: The term of this patent shall not extend beyond the expiration date of Pat. No. 5,162,947.

[21] Appl. No.: 41,649

[22] Filed: Apr. 1, 1993

[30] Foreign Application Priority Data

Apr. 6, 1992 [JP] Japan ................................. 4-083599
Jul. 16, 1992 [JP] Japan ................................. 4-189197

[51] Int. Cl.$^6$ ........................................... G02B 15/14
[52] U.S. Cl. .................................. 359/692; 359/689
[58] Field of Search ................................. 359/692, 683, 359/687, 688, 690, 689

[56] References Cited

U.S. PATENT DOCUMENTS 4,936,661 6/1990 Betensky et al. .................. 359/692

5,162,947 11/1992 Ito .

FOREIGN PATENT DOCUMENTS 62-264019 11/1987 Japan .
3127008 5/1991 Japan .
3200913 9/1991 Japan .

*Primary Examiner*—Scott J. Sugarman
*Attorney, Agent, or Firm*—Sughrue, Mion, Zinn, Macpeak & Seas

[57] ABSTRACT

A zoom lens system comprising, in order from the object side, a positive first lens group and a negative second lens group, with the focal length being changed by varying the distance between the first and second lens groups, which lens system is characterized in that said first lens group comprises, in order from the object side, a negative sub-group 1a and a positive sub-group 1b, said sub-group 1a comprising, in order from the object side, a negative first lens element having its smaller radius of curvature on the surface directed towards the object and a positive second lens element having a convex surface directed towards the image plane. The lens system satisfies a number of predetermined conditions.

13 Claims, 10 Drawing Sheets

1:4.7

—SA
--SC

-0.5  0.5
SPHERICAL
ABERRATION

SINE
CONDITION

1:4.7

——d-LINE
········g-LINE
---C-LINE

-0.5  0.5
SPHERICAL
ABERRATION

CHROMATIC
ABERRATION

ω = 36.0°

— S
-- M

-0.5  0.5
ASTIGMATISM

ω = 36.0°

-3.0  3.0 %
DISTORTION

1:5.6

−0.5    0.5
SPHERICAL
ABERRATION
SINE
CONDITION

—SA
--SC

1:5.6

−0.5    0.5
SPHERICAL
ABERRATION
CHROMATIC
ABERRATION

——d-LINE
······g-LINE
---C-LINE

ω=31.4°

−0.5    0.5
ASTIGMATISM

—S
--M

ω=31.4°

−3.0    3.0 %
DISTORTION

1:7.8

−0.5    0.5
SPHERICAL
ABERRATION
SINE
CONDITION

—SA
--SC

1:7.8

−0.5    0.5
SPHERICAL
ABERRATION
CHROMATIC
ABERRATION

——d-LINE
······g-LINE
---C-LINE

ω=24.1°

−0.5    0.5
ASTIGMATISM

—S
--M

ω=24.1°

−3.0    3.0 %
DISTORTION

FIG. 5
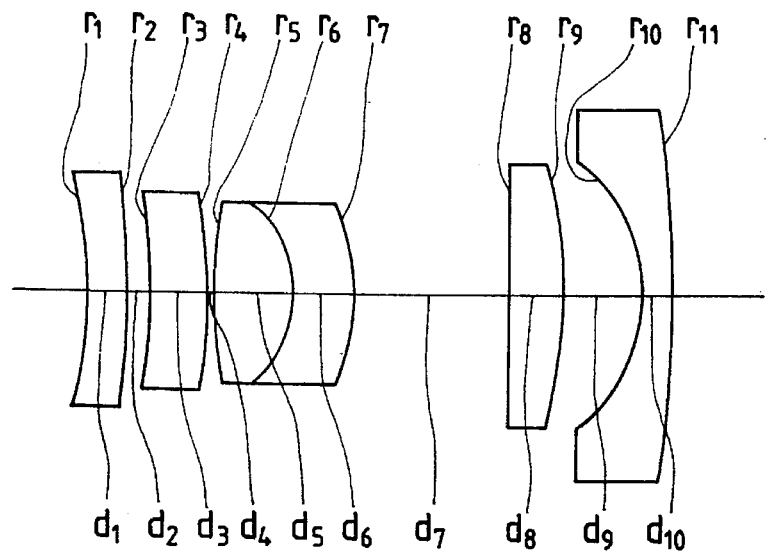
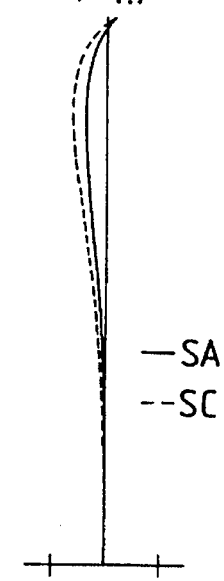
FIG. 6A
1:4.7
—SA
--SC
-0.5   0.5
SPHERICAL
ABERRATION
SINE
CONDITION
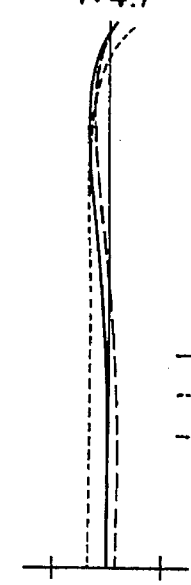
FIG. 6B
1:4.7
——d-LINE
······g-LINE
---C-LINE
-0.5   0.5
SPHERICAL
ABERRATION
CHROMATIC
ABERRATION
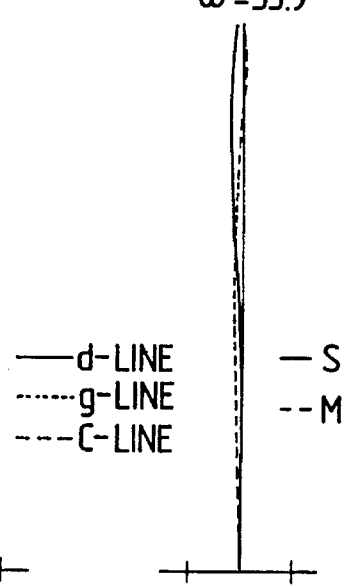
FIG. 6C
ω=35.9°
— S
-- M
-0.5   0.5
ASTIGMATISM
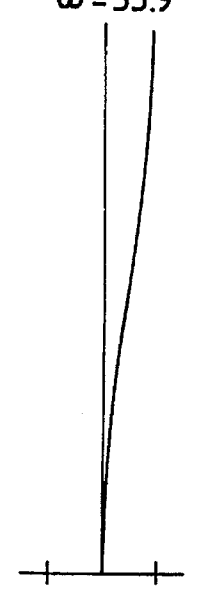
FIG. 6D
ω=35.9°
-3.0   3.0 %
DISTORTION

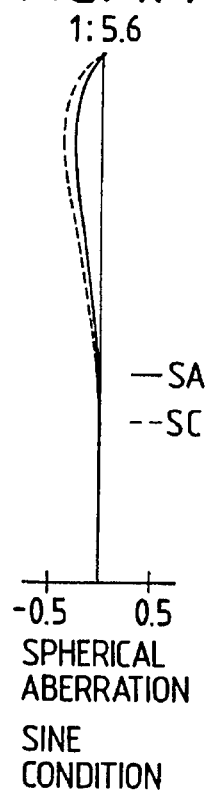
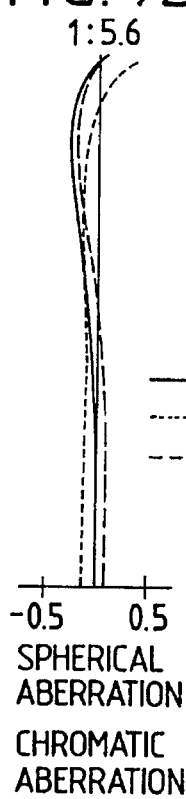
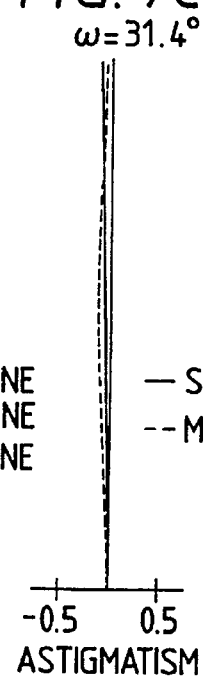
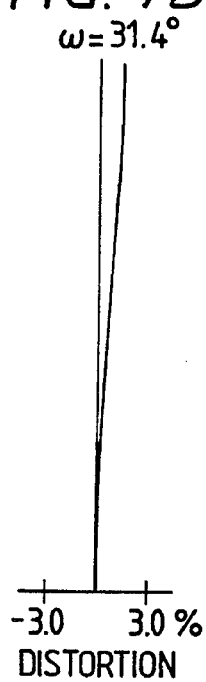
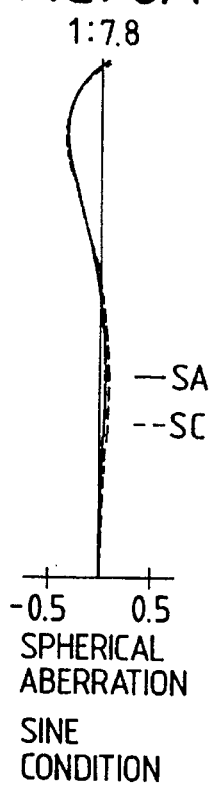
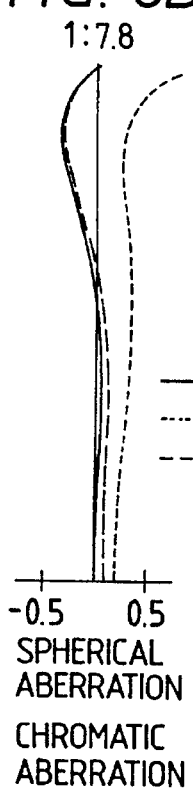
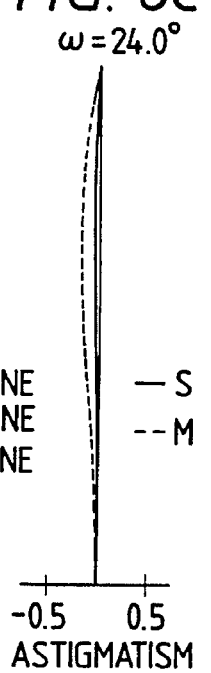
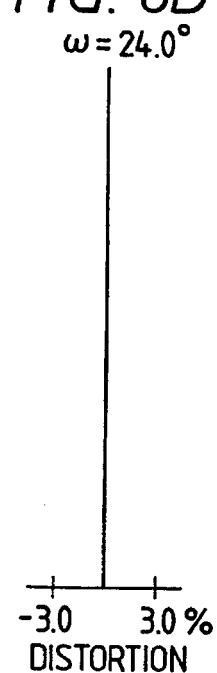

FIG. 9
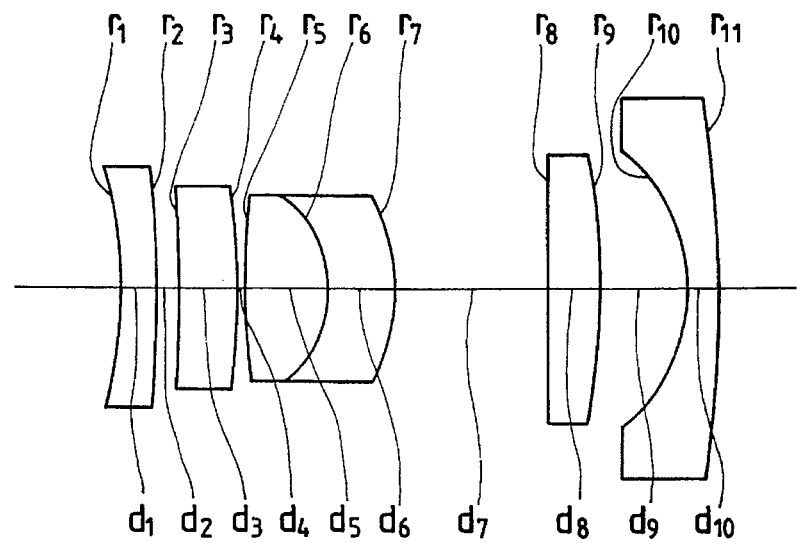
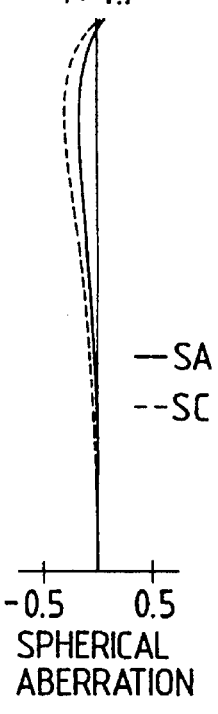
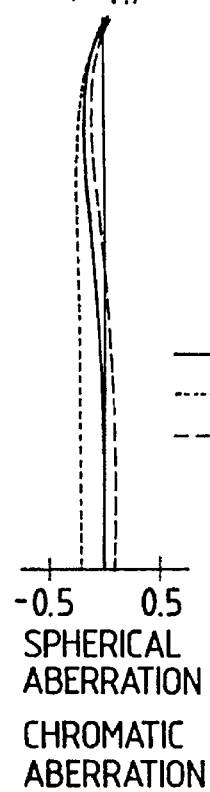
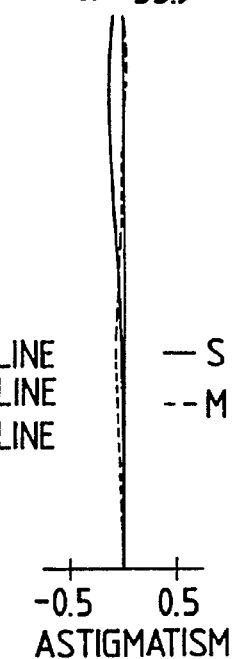
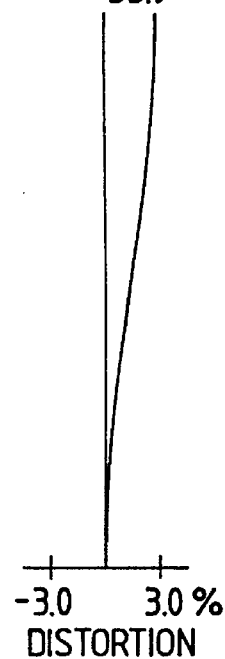
FIG. 10A
1:4.7
—SA
--SC
-0.5  0.5
SPHERICAL
ABERRATION
SINE
CONDITION
FIG. 10B
1:4.7
——d-LINE
······g-LINE
---C-LINE
-0.5  0.5
SPHERICAL
ABERRATION
CHROMATIC
ABERRATION
FIG. 10C
ω=35.9°
— S
-- M
-0.5  0.5
ASTIGMATISM
FIG. 10D
ω=35.9°
-3.0  3.0 %
DISTORTION

1:5.6

—SA
--SC

-0.5  0.5
SPHERICAL
ABERRATION
SINE
CONDITION

1:5.6

——d-LINE
······g-LINE
---C-LINE

-0.5  0.5
SPHERICAL
ABERRATION
CHROMATIC
ABERRATION

ω=31.3°

—S
--M

-0.5  0.5
ASTIGMATISM

ω=31.3°

-3.0  3.0 %
DISTORTION

1:8.5

—SA
--SC

-0.5  0.5
SPHERICAL
ABERRATION
SINE
CONDITION

1:8.5

——d-LINE
······g-LINE
---C-LINE

-0.5  0.5
SPHERICAL
ABERRATION
CHROMATIC
ABERRATION

ω=21.8°

—S
--M

-0.5  0.5
ASTIGMATISM

ω=21.8°

-3.0  3.0 %
DISTORTION

FIG. 13
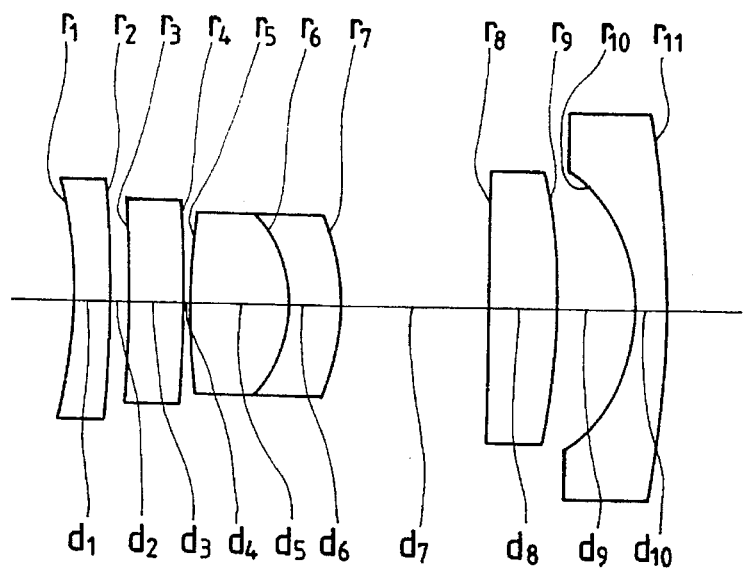
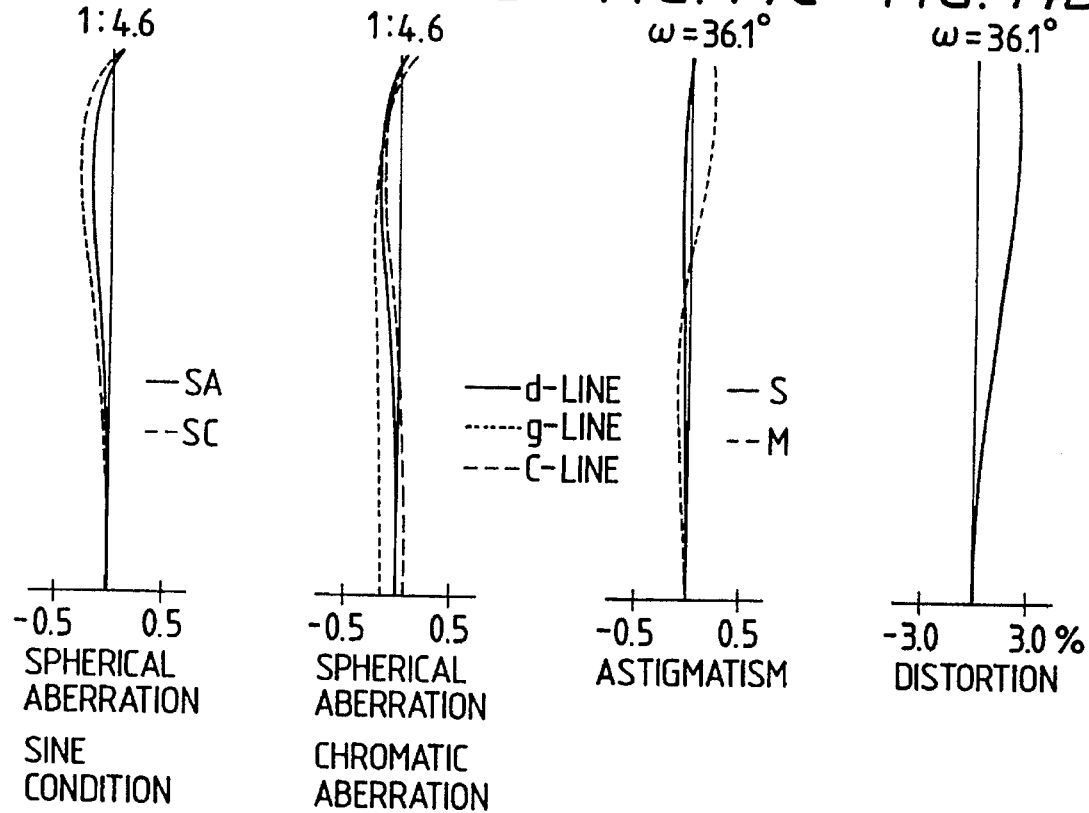
FIG. 14A  FIG. 14B  FIG. 14C  FIG. 14D

1:5.6

-0.5   0.5
SPHERICAL
ABERRATION

SINE
CONDITION

—SA
--SC

1:5.6

-0.5   0.5
SPHERICAL
ABERRATION

CHROMATIC
ABERRATION

——d-LINE
······g-LINE
---C-LINE $\omega=31.4°$

-0.5   0.5
ASTIGMATISM

— S
-- M $\omega=31.4°$

-3.0   3.0 %
DISTORTION

1:8.7

-0.5   0.5
SPHERICAL
ABERRATION

SINE
CONDITION

—SA
--SC

1:8.7

-0.5   0.5
SPHERICAL
ABERRATION

CHROMATIC
ABERRATION

——d-LINE
······g-LINE
---C-LINE $\omega=21.5°$

-0.5   0.5
ASTIGMATISM

— S
-- M $\omega=21.5°$

-3.0   3.0 %
DISTORTION

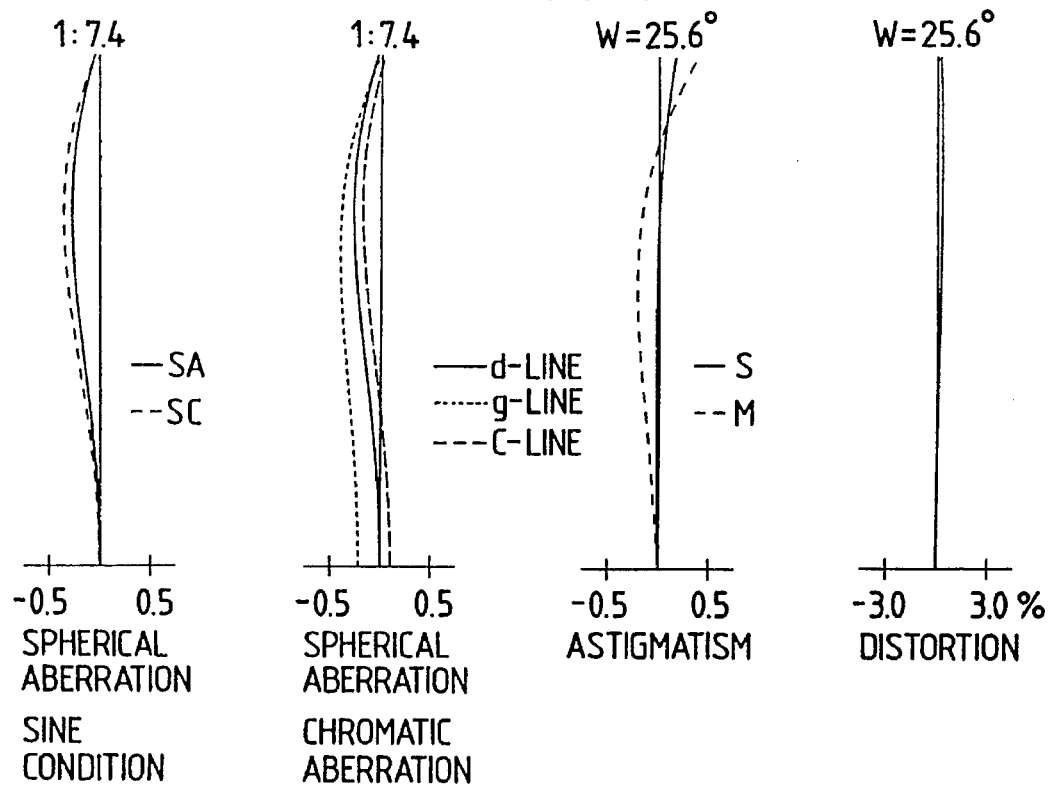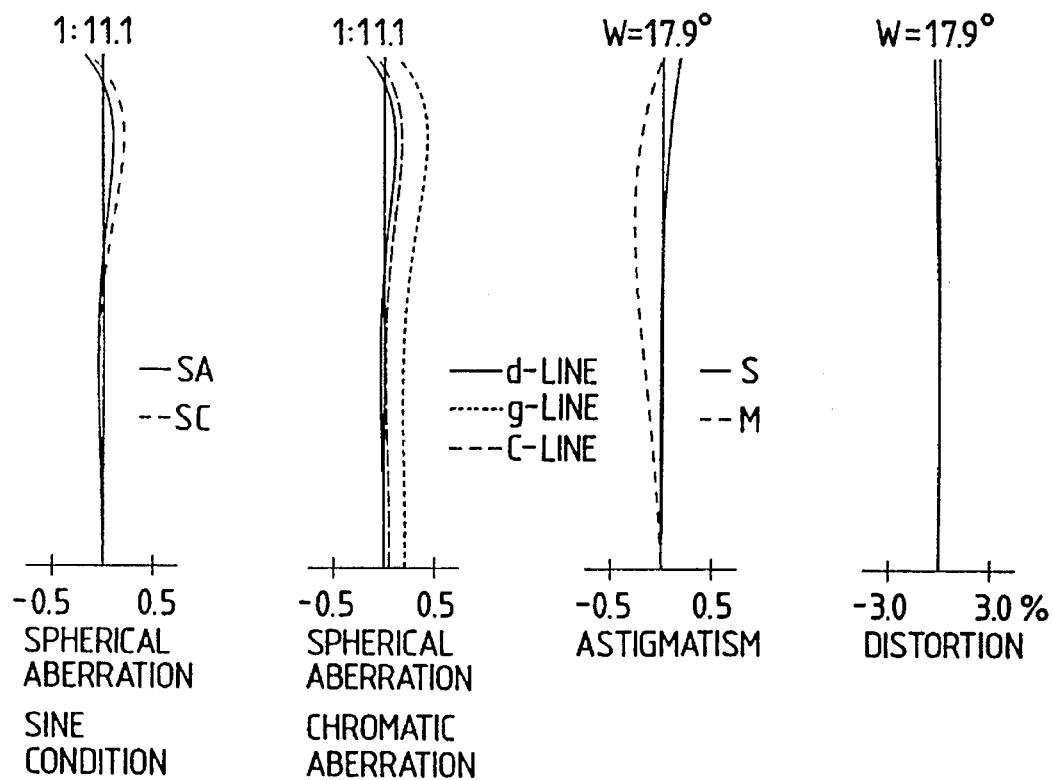

5,610,767

ZOOM LENS SYSTEM WITH SMALL NUMBERS OF LENSES AND WIDE VIEWING ANGLE

This application is based on and claims priority from Japanese Applications Nos. HEI 4-83599 filed Apr. 6, 1992 and HEI 4-189197 filed Jul. 16, 1992, the disclosures of which are incorporated herein by reference.

BACKGROUND OF THE INVENTION

The present invention relates to a zoom lens system that is suitable for use with compact cameras which have a smaller constraint on back focus than single-lens reflex cameras.

Two-group zoom lens systems of the type contemplated by the present invention that permit zoom ratios of about 2 and which are adapted for use with compact cameras have been known and available in various compositions. One example is a system that consists of about eight lens elements and which includes only spherical surfaces (see Japanese Patent Laid-Open Publication No. SHO 62-264019), while another example is a system that consists of four lens elements and which employs many aspheric surfaces (see Japanese Patent Laid-Open Publication No. HEI 3-127008).

However, both systems have problems of their own; the first-mentioned zoom lens system which is solely composed of spherical surfaces uses too many lens elements to warrant commercial use and the second zoom lens system which uses many aspheric surfaces presents substantial difficulty in attaining balance between compactness (the overall lens length should be kept short) and efficiency for the correction of chromatic aberrations. As a further problem, either type of zoom lens system features a half view angle of only about 30° at the wide-angle end, and it is desired to develop a system that has a wider coverage of viewing angles.

SUMMARY OF THE INVENTION

The present invention has been accomplished under these circumstances, and it is an object of the invention to provide a zoom lens system that uses a sufficiently smaller number of lens elements to make the system compact, which is capable of suppressing the occurrence of chromatic aberrations, and which features a wider viewing angle at the wide-angle end.

This and other objects are achieved by a zoom lens system comprising, in order from the object side, a positive first lens group and a negative second lens group, with the focal length being changed by varying the distance between the first and second lens groups, which lens system is characterized in that said first lens group comprises, in order from the object side, a negative sub-group 1a and a positive sub-group 1b, said sub-group 1a comprising, in order from the object side, a negative first lens element having its smaller radius of curvature on the surface directed towards the object and a positive second lens element having a convex surface directed towards the image plane. The zoom lens system preferably satisfies a number of conditions.

BRIEF DESCRIPTION OF THE DRAWINGS

The invention will be more clearly understood from the following description in conjunction with the accompanying drawings, in which:

FIG. 5 is a simplified cross-sectional view of the zoom lens system of Example 2;

FIGS. 6A–6D are a set of graphs plotting the aberration curves obtained with the zoom lens system of example 2 at the wide-angle end;

FIGS. 7A–7D are a set of graphs plotting the aberration curves obtained with the zoom lens system of Example 2 at the middle-angle position;

FIGS. 8A–8D are a set of graphs plotting the aberration curves obtained with the zoom lens system of Example 2 at the narrow-angle end;

FIG. 9 is a simplified cross-sectional view of the zoom lens system of Example 3;

FIG. 10A–10D are a set of graphs plotting the aberration curves obtained with the zoom lens system of Example 3 at the wide-angle end;

FIG. 13 is a simplified cross-sectional view of the zoom lens system of Example 4;

FIGS. 14A–14D are a set of graphs plotting the aberration curves obtained with the zoom lens system of Example 4 at the wide-angle end;

FIGS. 19A–19D are a set of graphs plotting the aberration curves obtained with the zoom lens system of Example 5 at the middle-angle position; and FIGS. 20A–20D are a set of graphs plotting the aberration curves obtained with the zoom lens system of Example 5 at the narrow-angle end.

DETAILED DESCRIPTION OF THE PREFERRED EMBODIMENTS

Figure 1:
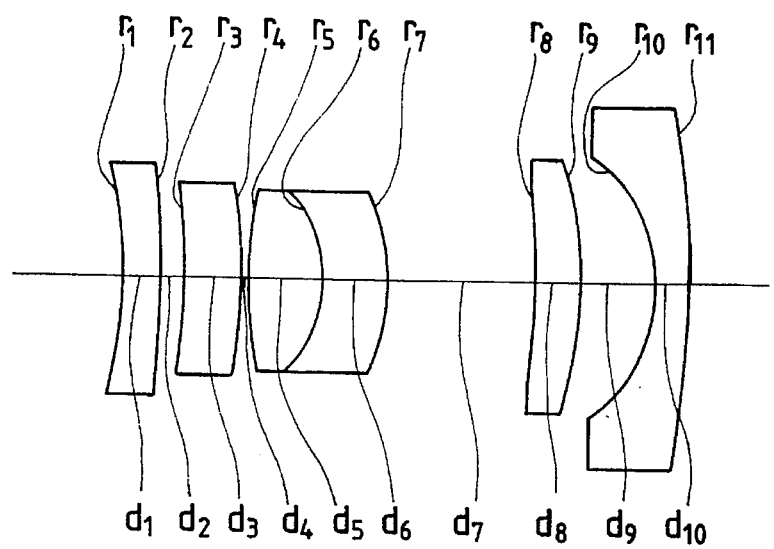
FIG. 1 is a simplified cross-sectional view of a zoom lens system of Example 1.
Figure 2A:
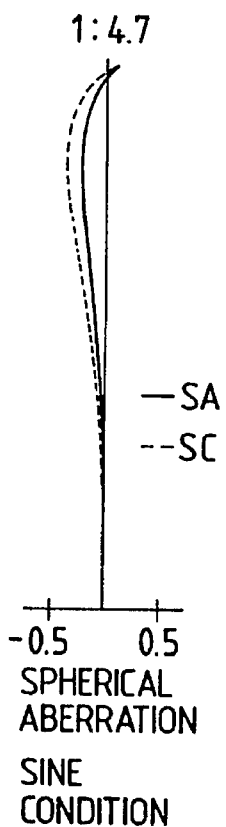
FIGS. 2A–2D are a set of graphs plotting the aberration curves obtained with the zoom lens system of Example 1 at the wide-angle end.
Figure 2B:
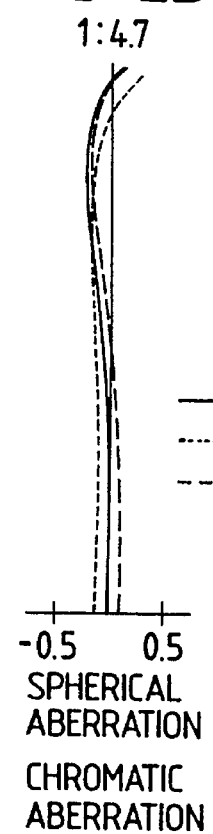
Figure 2C:
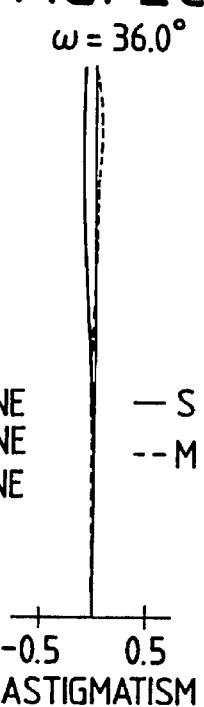
Figure 2D:
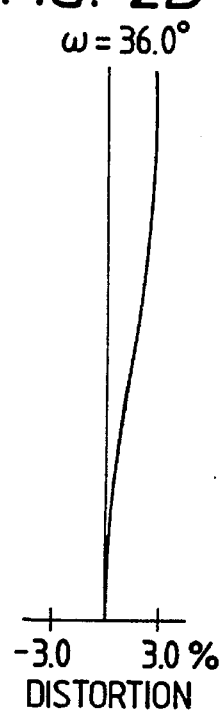
Figure 3A:
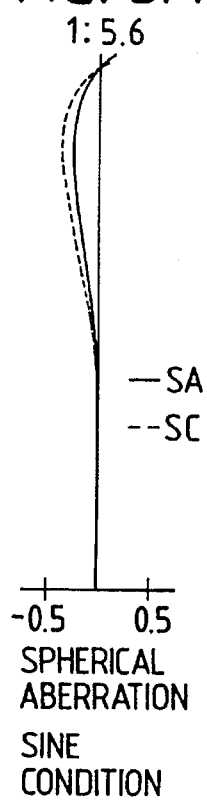
FIGS. 3A–3D are a set of graphs plotting the aberration curves obtained with the zoom lens system of Example 1 at the middle-angle position.
Figure 3B:
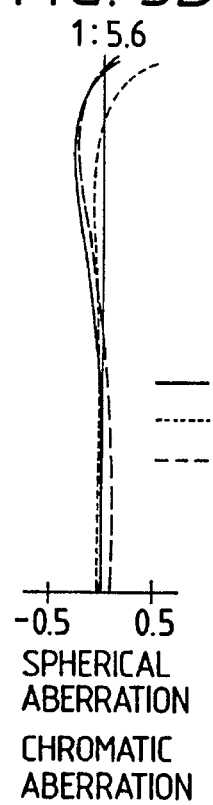
Figure 3C:
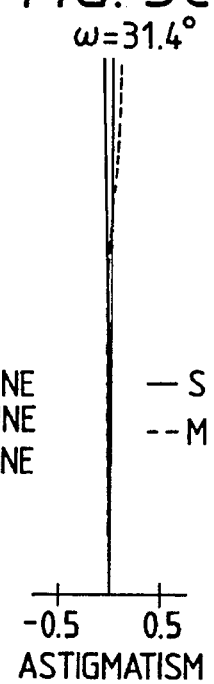
Figure 3D:
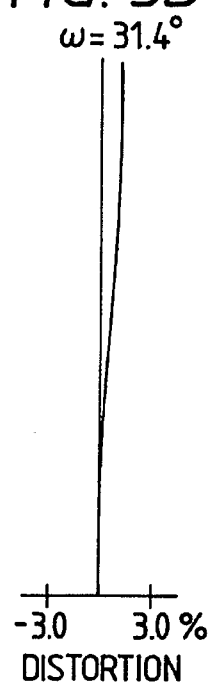
Figure 4A:
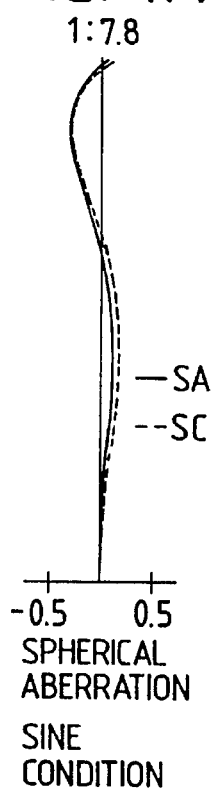
FIGS. 4A–4D are a set of graphs plotting the aberration curves obtained with the zoom lens system of Example 1 at the narrow-angle end.
Figure 4B:
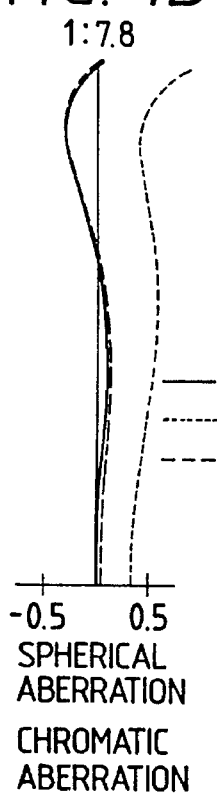
Figure 4C:
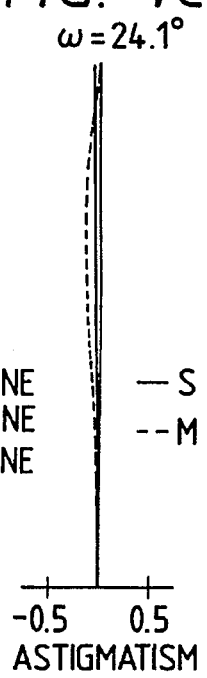
Figure 4D:
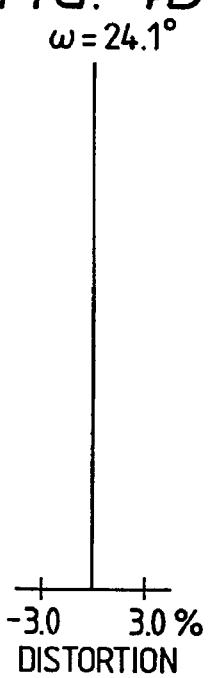
Figure 11A:
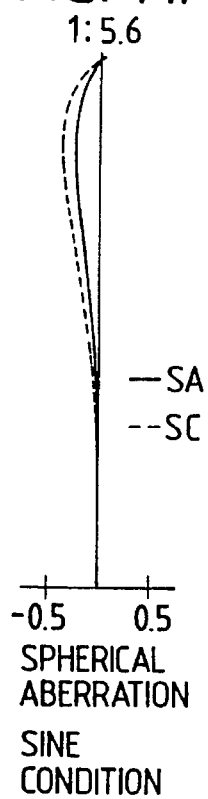
FIGS. 11A–11D are a set of graphs plotting the aberration curves obtained with the zoom lens system of Example 3 at the middle-angle position.
Figure 11B:
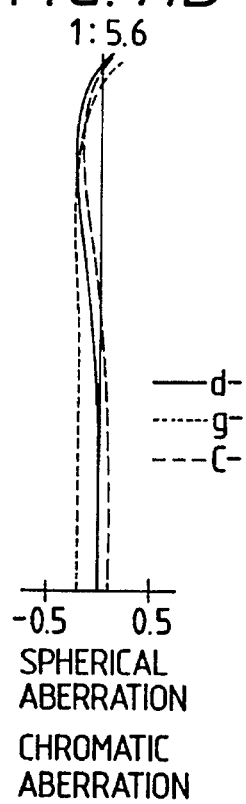
Figure 11C:
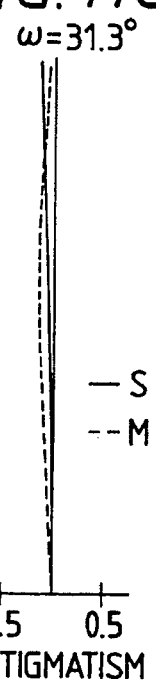
Figure 11D:
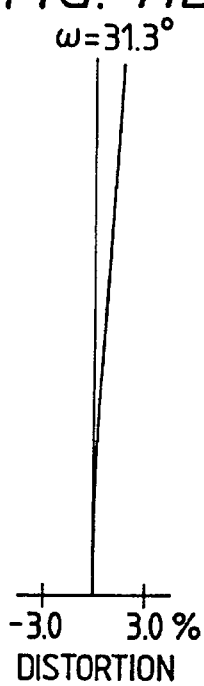
Figure 12A:
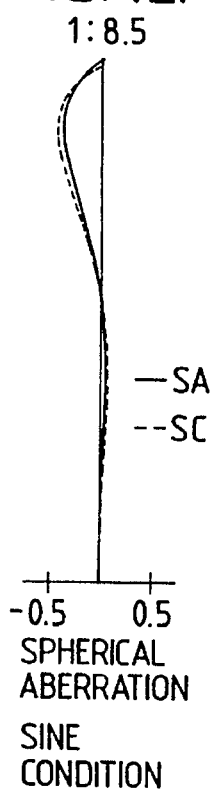
FIGS. 12A–12D are a set of graphs plotting the aberration curves obtained with the zoom lens system of Example 3 at the narrow-angle end.
Figure 12B:
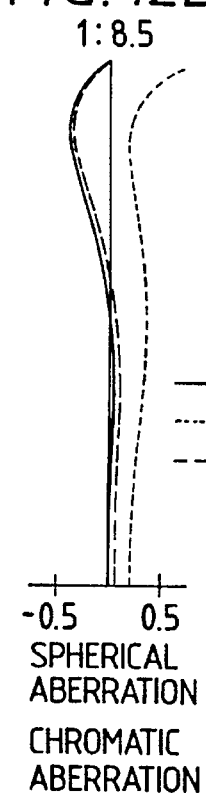
Figure 12C:
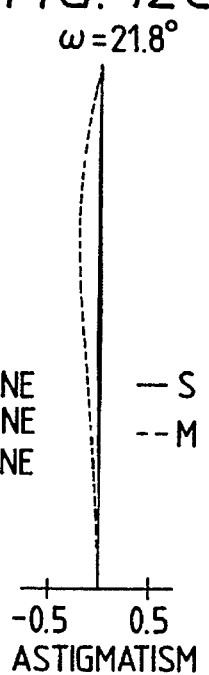
Figure 12D:
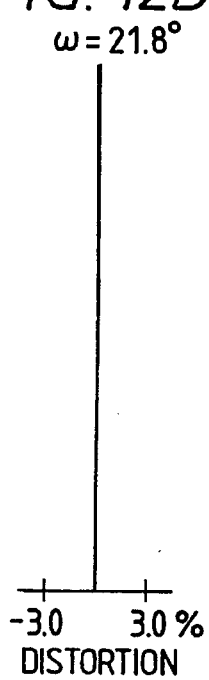
Figure 15A:
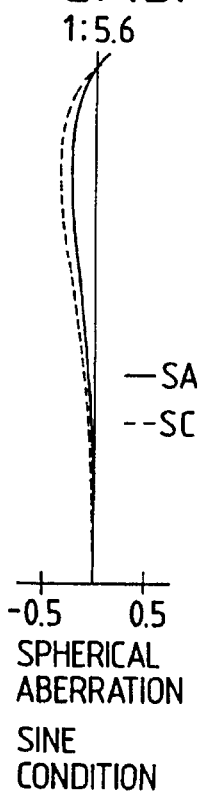
FIGS. 15A–15D are a set of graphs plotting the aberration curves obtained with the zoom lens system of Example 4 at the middle-angle position.
Figure 15B:
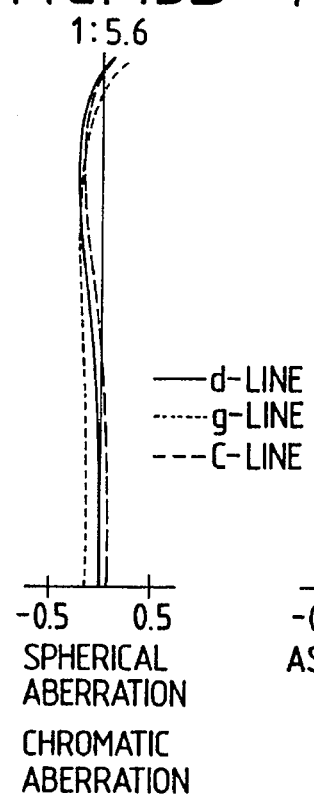
Figure 15C:
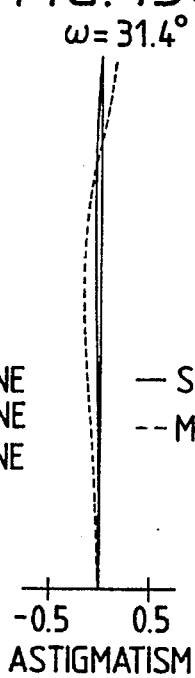
Figure 15D:
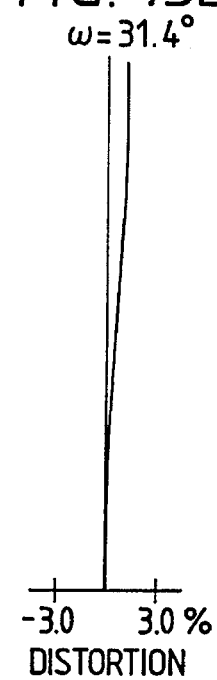
Figure 16A:
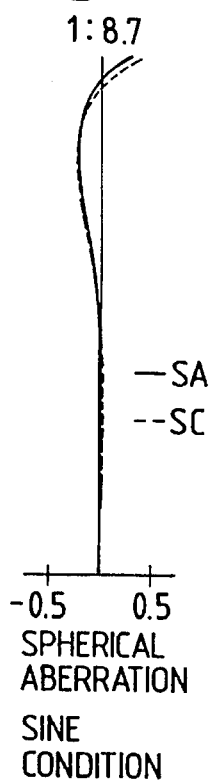
FIGS. 16A–16D are a set of graphs plotting the aberration curves obtained with the zoom lens system of Example 4 at the narrow-angle end.
Figure 16B:
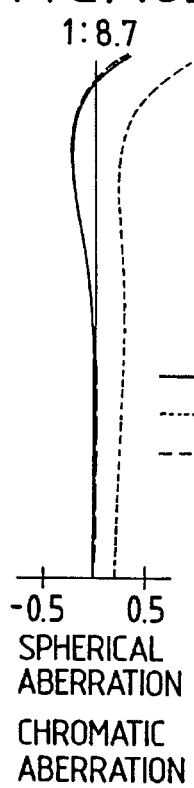
Figure 16C:
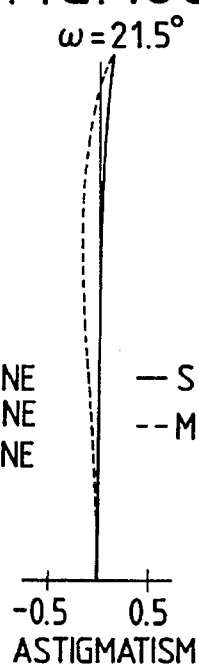
Figure 16D:
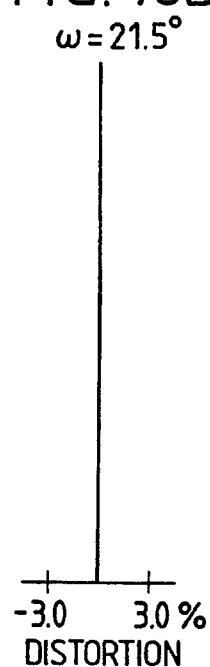

As described above, the general construction of the preferred embodiment of the zoom lens system according to the present invention includes, in order from the object side, a positive first lens group and a negative second lens group, with the focal length being changed by varying the distance between the first and second lens groups, which lens system is characterized in that said first lens group comprises, in order from the object side, a negative sub-group 1a and a positive sub-group 1b, said sub-group 1a comprising, in order from the object side, a negative first lens element having its smaller radius of curvature on the surface directed towards the object and a positive second lens element having a convex surface directed towards the image plane.

The lens system also preferably satisfies a number of conditions, which will now be described in detail, beginning with the following conditions (1)–(5):

$$-2.5 < f_s/r_1 < -0.8 \quad (1)$$

$$-2.0 < f_s/r_4 < -0.2 \quad (2)$$

$$-1.2 < f_s/f_{1a1} < -0.3 \quad (3)$$

$$-0.9 < f_s/f_{1a} < 0.0 \quad (4)$$

$$0.12 < (d_1+d_2+d_3)/f_s < 0.4 \quad (5)$$

where $r_i$ is the radius of curvature of the ith surface, $f_s$ is the focal length of the overall system at the wide-angle end, a $f_{1a1}$ is the focal length of the first lens element in sub-group 1a, $f_{1a}$ is the focal length of sub-group 1a, and $d_i$ is the distance between the ith surface and the (i+1)th surface.

In order to satisfy the two apparently conflicting requirements of increasing the half view angle at the wide-angle end while insuring that the lens diameter is kept small, the zoom lens system of the present invention is so designed that the first lens group comprises, in order from the object side, a sub-group 1a that comprises, in order from the object side, a negative first lens element and a positive second lens element and which has an overall negative power, and a positive sub-group 1b.

With a telephoto zoom lens system whose overall composition is of a two-group type that consists of a positive and a negative group, it has heretofore been known that adapting the positive first lens group to be of a retrofocus type which consists of a negative sub-group 1a and a positive sub-group 1b is advantageous for the purpose of rendering the overall system compact.

The present invention is characterized in that, in order to meet its other goal, i.e., increasing the half view angle at the wide-angle end, the negative sub-group 1a is composed of two lens elements, one being a negative first lens element having its smaller radius of curvature on the surface directed towards the object, and a positive second element having a convex surface directed towards the image plane, which are arranged in that order from the object side. The first lens element in the prior art two-group zoom lens system commonly has a convex surface directed towards the object. In contrast, the first lens element in the zoom lens system of the preferred embodiments of the present invention has a concave surface directed towards the object. Because of this feature, the zoom lens system of the present invention provides a wider viewing angle at the wide-angle end and yet keeps the lens diameter reasonably small.

Condition (1) relates to the concave surface of the negative first lens element which is directed towards the object. Only when this condition is met can the power of the first lens group be set at a large value with a reduced lens diameter. If the upper limit of condition (1) is exceeded, the radius of curvature of the concave surface will increase, and this means that aberrations will increase if the lens diameter is reduced, thus requiring that the lens diameter be increased. If, on the other hand, the lower limit of condition (1) is not satisfied, the radius of curvature of the concave surface will become so small that astigmatism is undercorrected.

Condition (2) relates to the convex surface of the positive second lens element in the sub-group 1a which is directed towards the image. Only when this condition is met can the aberrations occurring at the concave surface of the negative first lens element be effectively corrected within the sub-group 1a. If the upper limit of condition (2) is exceeded, the radius of curvature of the convex surface becomes so large that it is difficult to correct the aberrations that occur at the concave surface of the first lens element. If the lower limit of condition (2) is not satisfied, the radius of curvature of the convex surface becomes so small that higher-order aberrations will develop.

Instead of satisfying the geometric condition (2), the positive lens element on the image side of the sub-group 1a may be provided with a power that satisfies condition (6) described below, so that the aberrations that develop at the concave surface of the negative first lens element can be corrected within the sub-group 1a. If the lower limit of condition (6) is not satisfied, it becomes difficult to correct the aberrations that occur at the concave surface of the first lens element. If the upper limit of condition (6) is exceeded, the powers of both the negative first lens element and the positive second lens element in the sub-group 1a are prone to increase so much that higher-order aberrations will inevitably occur. At the same time, the back focus at the wide-angle end will decrease and the lens diameter of the rear group will increase.

Condition (3) relates to the power of the negative first lens element in the sub-group 1a. If the upper limit of this condition is exceeded, it becomes difficult to guarantee a wide viewing angle. If the lower limit of condition (3) is not satisfied, the power of the negative first lens element becomes excessive, thus presenting difficulty in correcting astigmatism.

Condition (4) relates to the composite power of the sub-group 1a. If the upper limit of this condition is exceeded, the power of the sub-group 1a will not be negative, thus making it difficult to attain aberrational balance with the positive sub-group 1b. As a result, the power of the positive first lens group cannot be sufficiently increased to realize a compact overall system. If the lower limit of condition (4) is not satisfied, the power of the positive second lens element will decrease so much as to make it impossible to correct the aberrations that occur in the negative first lens element, whereupon it becomes difficult to attain aberrational balance within the sub-group 1a.

Condition (5) relates to the lens thickness as measured from the first lens element to the second lens element in the sub-group 1a. If the upper limit of condition (5) is exceeded, not only the overall lens length but also the lens diameter of the sub-group 1a will increase. If the lower limit of condition (5) is not satisfied, it becomes difficult to increase the viewing angle that can be attained and, in order to adapt the first lens group to be operable as a retrofocus type, the radii of curvature of the first and fourth surfaces must be reduced, but it then becomes difficult to correct aberrations.

For further cost reduction, the second lens element in the sub-group 1a or the positive first lens element on the object side within the second lens group is desirably a plastic lens. In order to use a plastic lens as the second lens element in the sub-group 1a, the latter preferably satisfies the following condition (6):

$$0 < f_s/f_{1a2} < 0.7 \quad (6)$$

where $f_{1a2}$ is the focal length of the second lens element in the sub-group 1a.

Condition (6) specifies the power of the plastic lens, and it must be satisfied in order to cancel the variations in focus that occur due to the temperature-dependent extension or contraction of the lens barrel. If the upper limit of this condition (6) is exceeded, the power of the plastic lens increases so much that the overall system will experience increased variations in focus in response to the change in temperature or humidity. If the lower limit of condition (6) is not satisfied, the plastic lens is no longer a positive lens and it is impossible to cancel the variations in focus that occur due to the change in the temperature of the lens barrel.

If the second lens element in the sub-group 1a is to be a plastic lens, it also desirably has a divergent aspheric surface that satisfies the following condition (7):

$$-35 < \Delta I < -5 \tag{7}$$

where $\Delta I$ is the amount of variation in the coefficient of a spherical aberration due to the aspheric surface, as calculated with the focal length at the wide-angle end being taken as 1.0.

Only when condition (7) is satisfied can the spherical aberration developing in the overall system be suppressed to a low level. If the upper limit of this condition is exceeded, the aspheric surface will not be very effective in correcting spherical aberration. If the lower limit of condition (7) is not satisfied, the amount of sphericity will increase so much as to introduce difficulty in the manufacture of an aspheric surface.

If the positive first lens element on the object said of the second lens group is to be a plastic lens, it is desirably set to satisfy the following condition (8):

$$0.1 < f_2/f_{21} < 0.8 \tag{8}$$

where $f_{21}$ is the focal length of the first lens element of the second group. If the upper limit of condition (8) is exceeded, increased variations in focus will occur in response to changes in temperature or humidity. If the lower limit of this condition is not satisfied, the power of the positive lens becomes excessively small, making it difficult to correct aberrations within the second lens group which has a large negative power.

If the positive first lens element in the second lens group is to be a plastic lens, it is also preferred that this first lens element have an aspheric surface and satisfies the following condition (9):

$$0.0 < \Delta V < 0.3 \tag{9}$$

where $\Delta V$ is the amount of variation in the distortion coefficient due to the aspheric surface, as calculated with the focal length at the wide-angle end being taken as 1.0.

With a telephoto zoom lens system of the type under consideration, the probability of the occurrence of distortion will increase as the overall lens length is shortened. Distortion can be corrected effectively if an aspheric lens satisfying condition (9) is used as the positive lens element on the object side of the second lens group. The positive lens element in the second lens group has the smaller lens diameter and can be manufactured more easily than the other element in the second lens group; therefore, this element is adapted for fabrication as an aspheric lens.

If the upper limit of condition (9) is exceeded, the amount of sphericity will increase so much as to introduce difficulty in the manufacture of an aspheric surface. If the lower limit of condition (9) is not satisfied, the effectiveness of the aspheric surface for correcting distortion will be too little.

In order to reduce the amount by which the two lens groups have to be moved for zooming, the following condition (10) is desirably satisfied:

$$1.0 < |f_{1G}/f_{2G}| < 1.2 \tag{10}$$

where $f_{1G}$ is the focal length of the first lens group, and $f_{2G}$ is the focal length of the second lens group.

In order to shorten the overall lens system, one needs to reduce the powers of both the first and second lens groups. The amount by which the two lens groups have to be moved for zooming can be suppressed at low level if the power of the negative second lens group is made greater than that of the positive first lens group.

If the upper limit of condition (10) is exceeded, the overall lens length can advantageously be shortened but, on the other hand, the negative power of the second lens group will become excessive, making it difficult to correct astigmatism and distortion. If the lower limit of condition (10) is not satisfied, the situation is favorable for the correction of aberrations but, on the other hand, the second lens group has to be moved by a greater amount and the overall lens length will increase.

EXAMPLE 1

FIG. 1 is a simplified cross-sectional view showing diagrammatically the zoom lens system of Example 1. Specific data for this example are shown in Tables 1 and 2, in which FNO. denotes the F number of an individual lens, f denotes the focal length, fB denotes the back focus, ω denotes the half view angle, r denotes the radius of curvature, d denotes the lens thickness or the airspace between lenses, n denotes the refractive index at the d-line (588 nm), and v denotes the Abbe number.

FIGS. 2A–2D, 3A–3D and 4A–4D are graphs plotting the aberration curves obtained with this lens system at the wide-angle end, middle-angle position and narrow-angle end, respectively. The illustrated aberration curves in these figures are the spherical aberration (SA), sine condition (SC), the chromatic aberrations represented by spherical aberrations at the d-, g- and c-lines, the lateral chromatic aberration, saggital astigmatism (S), the meridional astigmatism (M), and distortion.

In the lens system of Example 1, the third and eighth surfaces are aspheric. The shape of an aspheric surface is expressed by the following equation:

$$X = \frac{CY^2}{1 + \sqrt{1 - (1+K)C^2Y^2}} + A_4Y^4 + A_6Y^6 + A_8Y^8$$

where X is the distance by which the coordinates at the point on the aspheric surface where the height from the optical axis is Y are departed from the plane tangent to the vertex of the aspheric surface; C is the curvature (1/r) of the vertex of the aspheric surface; K is the conic constant; an $A_4$, $A_6$ and $A_8$ are the aspheric coefficients of the fourth, sixth and eighth orders, respectively. The radii of curvature of aspheric surfaces given in Table 1 are those of the vertices of the aspheric surfaces; the conic constant and aspheric coefficient of each aspheric surface are given in Table 3.

TABLE 1

| Surface No. | r | d | n | v |
|---|---|---|---|---|
| 1 | −17.714 | 1.68 | 1.80610 | 40.9 |
| 2 | −39.104 | 1.00 | | |
| 3 | −34.131 | 2.50 | 1.58547 | 29.9 |
| 4 | −23.320 | 0.30 | | |
| 5 | 18.714 | 3.29 | 1.53172 | 48.9 |

TABLE 1-continued

| Surface No. | r | d | n | ν |
|---|---|---|---|---|
| 6 | −5.330 | 2.86 | 1.80518 | 25.4 |
| 7 | −9.149 | variable | | |
| 8 | −33.357 | 2.09 | 1.58547 | 29.9 |
| 9 | −15.058 | 3.17 | | |
| 10 | −6.719 | 1.50 | 1.80610 | 40.9 |
| 11 | −35.809 | | | |

TABLE 2

| f | 29.0 | 35.0 | 48.5 |
|---|---|---|---|
| fB | 12.00 | 17.57 | 30.11 |
| FNo. | 1:4.7 | 1:5.6 | 1:7.8 |
| ω | 36.0° | 31.4° | 24.1° |
| d7 | 6.42 | 5.08 | 3.28 |

TABLE 3

| Third Surface | Eighth surface |
|---|---|
| K = 0.0 | K = 0.0 |
| $A_4 = -0.14087376 \times 10^{-3}$ | $A_4 = 0.16400036 \times 10^{-3}$ |
| $A_6 = 0.32574759 \times 10^{-5}$ | $A_6 = 0.21033652 \times 10^{-5}$ |
| $A_8 = -0.26532592 \times 10^{-7}$ | $A_8 = 0.44907553 \times 10^{-7}$ |

EXAMPLE 2

FIG. 5 is a simplified cross-sectional view showing diagrammatically the zoom lens system of Example 2. Specific data for this example are shown in Tables 4 and 5. FIGS. 6A–6D, 7A–7D and 8A–8D are graphs plotting the aberration curves obtained with this lens system at the wide-angle end, middle-angle position and narrow-angle end, respectively.

In the lens system of Example 2, the third and eighth surfaces are aspheric. The conic constant and aspheric coefficient of each aspheric surface are given in Table 6.

TABLE 4

| Surface No. | r | d | n | ν |
|---|---|---|---|---|
| 1 | −18.102 | 1.62 | 1.80610 | 40.9 |
| 2 | −44.675 | 1.00 | | |
| 3 | −39.209 | 2.50 | 1.58547 | 29.9 |
| 4 | −25.078 | 0.30 | | |
| 5 | 22.184 | 3.41 | 1.53172 | 48.9 |
| 6 | −5.307 | 2.74 | 1.80518 | 25.4 |
| 7 | −8.942 | variable | | |
| 8 | −68.095 | 2.48 | 1.58547 | 29.9 |
| 9 | −19.370 | 3.35 | | |
| 10 | −7.243 | 1.40 | 1.80610 | 40.9 |
| 11 | −47.105 | | | |

TABLE 5

| f | 29.0 | 35.0 | 48.5 |
|---|---|---|---|
| fB | 11.68 | 17.24 | 29.81 |
| FNo. | 1:4.7 | 1:5.6 | 1:7.8 |
| ω | 35.9° | 31.4° | 24.0° |
| d7 | 6.88 | 5.40 | 3.40 |

TABLE 6

| Third Surface | Eighth surface |
|---|---|
| K = 0.0 | K = 0.0 |
| $A_4 = -0.16738367 \times 10^{-3}$ | $A_4 = 0.15033600 \times 10^{-3}$ |
| $A_6 = 0.23581794 \times 10^{-5}$ | $A_6 = 0.13835301 \times 10^{-5}$ |
| $A_8 = 0.35991514 \times 10^{-8}$ | $A_8 = 0.25042230 \times 10^{-7}$ |

EXAMPLE 3

FIG. 9 is a simplified cross-sectional view showing diagrammatically the zoom lens system of Example 3. Specific data for this example are shown in Tables 7 and 8. FIGS. 10A–10D, 11A–11D and 12A–12D are graphs plotting the aberration curves obtained with this lens system at the wide-angle end, middle-angle position and narrow-angle end, respectively.

In the lens system of Example 3, the third and eighth surfaces are aspheric. The conic constant and aspheric coefficient of each aspheric surface are given in Table 9.

TABLE 7

| Surface No. | r | d | n | ν |
|---|---|---|---|---|
| 1 | −18.241 | 1.50 | 1.80610 | 40.9 |
| 2 | −50.671 | 1.00 | | |
| 3 | −143.200 | 2.50 | 1.58547 | 29.9 |
| 4 | −29.868 | 0.30 | | |
| 5 | 30.164 | 3.51 | 1.54072 | 47.2 |
| 6 | −5.164 | 2.90 | 1.84666 | 23.8 |
| 7 | −8.648 | variable | | |
| 8 | −104.763 | 2.41 | 1.58547 | 29.9 |
| 9 | −23.773 | 3.69 | | |
| 10 | −7.415 | 1.40 | 1.80610 | 40.9 |
| 11 | −49.211 | | | |

TABLE 8

| f | 29.0 | 35.0 | 48.5 |
|---|---|---|---|
| fB | 11.48 | 16.92 | 34.31 |
| FNo. | 1:4.7 | 1:5.6 | 1:8.5 |
| ω | 35.9° | 31.3° | 21.8 |
| d7 | 6.75 | 5.30 | 2.79 |

TABLE 9

| Third Surface | Eighth surface |
|---|---|
| K = 0.0 | K = 0.0 |
| $A_4 = -0.17152389 \times 10^{-3}$ | $A_4 = 0.15068294 \times 10^{-3}$ |
| $A_6 = 0.19870075 \times 10^{-5}$ | $A_6 = 0.10020136 \times 10^{-5}$ |
| $A_8 = 0.16706777 \times 10^{-7}$ | $A_8 = 0.21509303 \times 10^{-7}$ |

EXAMPLE 4

FIG. 13 is a simplified cross-sectional view showing diagrammatically the zoom lens system of Example 4. Specific data for this example are shown in Tables 10 and 11. FIGS. 14A–14D, 15A–15D and 16A–16D are graphs plotting the aberration curves obtained with this lens system at the wide-angle end, middle-angle position and narrow-angle end, respectively.

In the lens system of Example 4, the third and eighth surfaces are aspheric. The conic constant and aspheric coefficient of each aspheric surface are given in Table 12.

TABLE 10

| Surface No. | r | d | n | ν |
|---|---|---|---|---|
| 1 | −18.878 | 1.54 | 1.83400 | 37.2 |
| 2 | −56.851 | 0.80 | | |
| 3 | 434.000 | 2.57 | 1.58547 | 29.9 |
| 4 | −71.970 | 0.32 | | |
| 5 | 27.147 | 4.39 | 1.60311 | 60.7 |
| 6 | −5.577 | 2.30 | 1.83400 | 37.2 |
| 7 | −9.600 | variable | | |
| 8 | −66.380 | 3.00 | 1.58547 | 29.9 |
| 9 | −23.487 | 3.46 | | |
| 10 | −7.300 | 1.40 | 1.77250 | 49.6 |
| 11 | −40.691 | | | |

TABLE 11

| | | | |
|---|---|---|---|
| f | 29.0 | 35.0 | 55.0 |
| fB | 10.95 | 16.46 | 34.82 |
| FNo. | 1:4.6 | 1:5.6 | 1:8.7 |
| ω | 36.1° | 31.4° | 21.5° |
| d7 | 6.68 | 5.18 | 2.54 |

TABLE 12

| Third Surface | Eighth surface |
|---|---|
| K = 0.0 | K = 0.0 |
| $A_4 = -0.18033504 \times 10^{-3}$ | $A_4 = 0.16051417 \times 10^{-3}$ |
| $A_6 = 0.92166874 \times 10^{-6}$ | $A_6 = 0.10599391 \times 10^{-5}$ |
| $A_8 = -0.29938957 \times 10^{-7}$ | $A_8 = 0.27218433 \times 10^{-7}$ |

EXAMPLE 5

Figure 17:
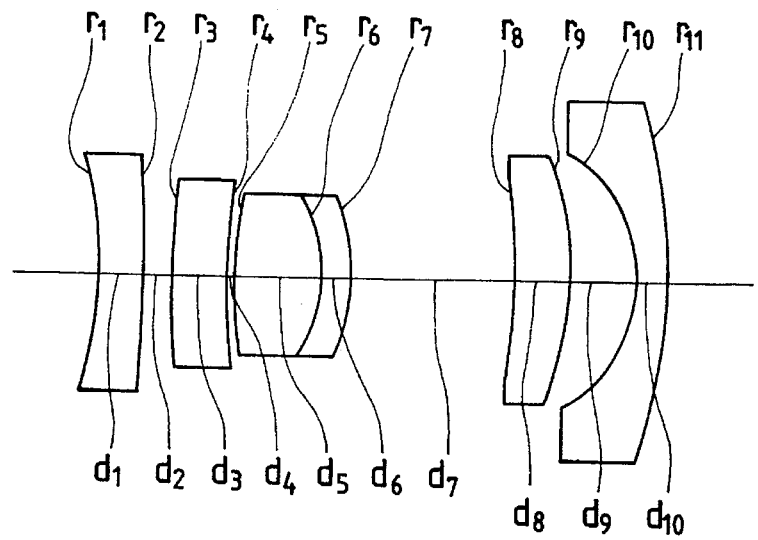
FIG. 17 is a simplified cross-sectional view of the zoom lens system of Example 5.
Figures 18A, 18B, 18C, 18D:
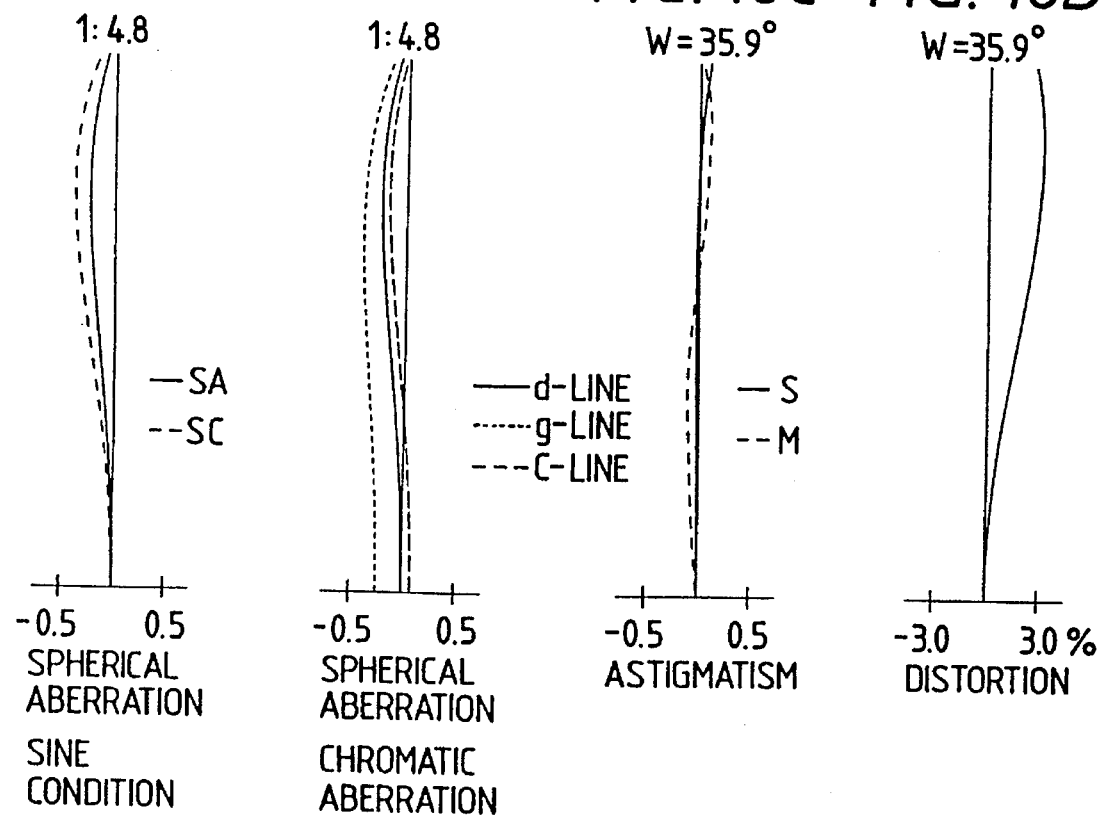
FIGS. 18A–18D are a set of graphs plotting the aberration curves obtained with the zoom lens system of Example 5 at the wide-angle end.

FIG. 17 is a simplified cross-sectional view showing diagrammatically the zoom lens system of Example 5. Specific data for this example are shown in tables 13 and 14. FIGS. 18A–18D, 19A–19D and 20A–20D are graphs plotting the aberration curves obtained with this lens system at the wide-angle end, middle-angle position and narrow-angle end, respectively.

In the lens system of Example 5, the third and eighth surfaces are aspheric. The conic constant and aspheric coefficient of each aspheric surface are given in Table 15.

TABLE 13

| Surface No. | r | d | n | ν |
|---|---|---|---|---|
| 1 | −19.800 | 2.09 | 1.83400 | 37.2 |
| 2 | −77.176 | 1.33 | | |
| 3 | 30.602 | 2.57 | 1.58547 | 29.9 |
| 4 | 44.596 | 0.30 | | |
| 5 | 22.439 | 3.99 | 1.60311 | 60.7 |
| 6 | −6.783 | 1.30 | 1.83400 | 37.2 |
| 7 | −10.118 | 7.54–4.50–2.65 | | |
| 8 | −23.229 | 2.58 | 1.58547 | 29.9 |
| 9 | −14.406 | 3.13 | | |
| 10 | −6.736 | 1.40 | 1.77250 | 49.6 |
| 11 | −27.192 | | | |

TABLE 14

| | | | |
|---|---|---|---|
| f | 29.0 | 45.0 | 67.30 |
| fB | 10.56 | 25.15 | 45.60 |
| fNo. | 1:4.8 | 1:7.4 | 1:11.1 |
| ω | 35.9° | 25.6° | 17.9° |
| d7 | 7.54 | 4.50 | 2.65 |

TABLE 15

| Third Surface | Eighth surface |
|---|---|
| K = 0.0 | K = 0.0 |
| $A_4 = -0.20293624 \times 10^{-3}$ | $A_4 = 0.18324926 \times 10^{-3}$ |
| $A_6 = -0.34728404 \times 10^{-5}$ | $A_6 = 0.20839418 \times 10^{-5}$ |
| $A_8 = 0.0$ | $A_8 = 0.63268298 \times 10^{-7}$ |
| $A_{10} = 0.0$ | $A_{10} = 0.0$ |
| $A_{12} = 0.0$ | $A_{12} = 0.0$ |

The following Table 16 shows how the values calculated for each of Examples 1 to 4 satisfy the conditions (1) to (10).

TABLE 16

| Condition | Ex. 1 | Ex. 2 | Ex. 3 | Ex. 4 | Ex. 5 |
|---|---|---|---|---|---|
| (1) $f_s/r_1$ | −1.64 | −1.60 | −1.59 | −1.54 | −1.46 |
| (2) $f_s/r_4$ | −1.24 | −1.16 | −0.97 | −0.40 | 0.65 |
| (3) $f_s/r_{1a1}$ | −0.70 | −0.75 | −0.80 | −0.84 | −0.89 |
| (4) $f_s/r_{1a}$ | −0.40 | −0.44 | −0.30 | −0.54 | −0.71 |
| (5) $(d_1 + d_2 + d_3)/f_s$ | 0.18 | 0.18 | 0.17 | 0.17 | 0.2 |
| (6) $f_s/r_{1a2}$ | 0.25 | 0.26 | 0.45 | 0.27 | 0.19 |
| (7) Δl | −20.8 | −24.7 | −25.3 | −26.0 | −32.9 |
| (8) $f_s/f_{21}$ | 0.64 | 0.64 | 0.56 | 0.48 | 0.50 |
| (9) ΔV | 0.098 | 0.106 | 0.101 | 0.08 | 0.14 |
| (10) $f_{1G}/|f_{2G}|$ | 1.08 | 1.07 | 1.09 | 1.09 | 1.09 |

As described above, the present invention provides a zoom lens system suitable for use with compact cameras, that has a shorter overall length and which yet features a wider viewing angle at the wide-angle end.

If the lens arrangement and power distribution are adapted for the use of plastic lenses, a low-cost zoom lens system can be produced using a smaller number of lens components.

What is claimed is:

1. A zoom lens system, comprising, in order from the object side:

a positive first lens group and a negative second lens group, said first lens group comprising, in order from the object side, a negative sub-group 1a and a positive sub-group 1b, wherein the focal length of the zoom lens is changed by varying the distance between the first and second lens groups while maintaining constant the distance between said sub-groups 1a and 1b, and said sub-group 1a comprising, in order from the object side, a negative first lens element having its surface of greater curvature on the surface directed towards the object and a positive second lens element;

wherein said lens system satisfies the following condition:

$$-1.2 < f_s/f_{1a1} < -0.3 \qquad (3)$$

where $f_s$ is the focal length of the overall lens system at the wide-angle end, and $f_{1a1}$ is the focal length of the first lens element in sub-group 1a.

2. A zoom lens system according to claim 1, wherein said lens system satisfies the following condition:

$$-2.5 < f_s/r_1 < -0.8 \qquad (1)$$

where $f_s$ is the focal length of the overall lens system at the wide-angle end, and $r_1$ is the radius of curvature of the first surface on the object side of the lens system.

3. A zoom lens system according to claim 2, wherein said lens system satisfies the following condition:

$$-2.0 < f_s/r_4 < -0.2 \qquad (2)$$

where $f_s$ is the focal length of the overall lens system at the wide-angle end, and $r_4$ is the radius of curvature of the fourth surface numbered from the object side of the lens system.

4. A zoom lens system according to claim 1, wherein said lens system satisfies the following condition:

$$-0.9 < f_s/f_{1a} < 0.0 \tag{4}$$

where $f_s$ is the focal length of the overall lens system at the wide-angle end, and $f_{1a}$ is the focal length of the sub-group 1a.

5. A zoom lens system according to claim 1, wherein said lens system satisfies the following condition:

$$0.12 < (d_1+d_2+d_3)/f_s < 0.4 \tag{5}$$

where $f_s$ is the focal length of the overall lens system at the wide-angle end, and $d_i$ are the respective distances between the ith surface and the (i+1)th surface.

6. A zoom lens system according to claim 1, wherein said second lens element in said sub-group 1a is a plastic lens element, and said lens system satisfies the following condition:

$$0 < f_s/f_{1a2} < 0.7 \tag{6}$$

where $f_s$ is the focal length of the overall lens system at the wide-angle end, and $f_{1a2}$ is the focal length of the second lens element in the sub-group 1a.

7. A zoom lens system according to claim 6, wherein said second lens element in said sub-group 1a includes a divergent aspheric surface that satisfies the following condition:

$$-35 < \Delta I < -5 \tag{7}$$

where $\Delta I$ is the amount of variation in the coefficient of a spherical aberration due to the aspheric surface, as calculated with the focal length at the wide-angle end being taken as 1.0.

8. A zoom lens system according to claim 1, wherein said second lens group includes a positive first lens element on its object side which is made of plastic and satisfies the following condition:

$$0.1 < f_s/f_{21} < 0.8 \tag{8}$$

where $f_s$ is the focal length of the overall lens system at the wide-angle end, and $f_{21}$ is the focal length of the first lens element of the second group.

9. A zoom lens system according to claim 1, wherein said lens system satisfies the following condition:

$$1.0 < f_{1G}/f_{2G} < 1.2 \tag{10}$$

where $f_{1G}$ is the focal length of the first lens group, and $f_{2G}$ is the focal length of the second lens group.

10. A zoom lens according to claim 1, wherein said positive second lens element in said sub-group 1a has a convex surface directed towards the image plane.

11. A zoom lens system, comprising, in order from the object side: a positive first lens group and a negative second lens group, wherein the focal length of the zoom lens is changed by varying the distance between the first and second lens groups, said first lens group comprising, in order from the object side, a negative sub-group 1a and a positive sub-group 1b, said sub-group 1a comprising, in order from the object side, a negative first lens element having its surface of greater curvature on the surface directed towards the object and a positive second lens element having a convex surface directed towards the image plane, wherein said lens system satisfies the following conditions:

$$-2.0 < f_s/r_4 \leq 0.40 \tag{2}$$

$$-0.89 \leq f_s/f_{1a1} < -0.3 \tag{3}$$

where $f_s$ is the focal length of the overall lens system at the wide-angle end, $r_4$ is the radius of curvature of the fourth surface numbered from the object side of the lens system, and $f_{1a1}$ is the focal length of the first lens element in sub-group 1a.

12. A zoom lens system, comprising, in order from the object side: a positive first lens group and a negative second lens group, wherein the focal length of the zoom lens is changed by varying the distance between the first and second lens groups, said first lens group comprising, in order from the object side, a negative sub-group 1a and a positive sub-group 1b, said sub-group 1a comprising, in order from the object side, a negative first lens element having its surface of greater curvature on the surface directed towards the object and a positive second lens element, said lens system satisfying the following conditions:

$$0 < f_s/f_{1a2} \leq 0.45 \tag{6}$$

$$-0.89 < f_s/f_{1a1} < -0.3 \tag{3}$$

where $f_s$ is the focal length of the overall system at the wide-angle end, a $f_{1a1}$ is the focal length of the first lens element in sub-group 1a, and $f_{1a2}$ is the focal length of the second lens element in the sub-group 1a.

13. A zoom lens system, comprising, in order from the object side: a positive first lens group and a negative second lens group, wherein the focal length of the zoom lens is changed by varying the distance between the first and second lens groups, said first lens group comprising, in order from the object side, a negative sub-group 1a and a positive sub-group 1b, said sub-group 1a comprising, in order from the object side, a negative first lens element having its surface of greater curvature on the surface directed towards the object and a positive second lens element, wherein said second lens element in said sub-group 1a includes a divergent aspheric surface that satisfies the following condition:

$$-35 < \Delta I < -5 \tag{7}$$

where $\Delta I$ is the amount of variation in the coefficient of a spherical aberration due to the aspheric surface, as calculated with the focal length at the wide-angle end being taken as 1.0.

* * * * *